US006143226A

United States Patent [19]

Fujimoto et al.

[11] Patent Number: 6,143,226

[45] Date of Patent: Nov. 7, 2000

[54] INJECTION COMPRESSION MOLDING METHOD AND APPARATUS

[75] Inventors: Satoshi Fujimoto, Mishima; Makoto Nogawa, Hirakata, both of Japan

[73] Assignee: Komatsu Ltd. & Satoshi Fujimoto, Tokyo, Japan

[21] Appl. No.: 08/849,178

[22] PCT Filed: Nov. 27, 1995

[86] PCT No.: PCT/JP95/02405

§ 371 Date: May 28, 1997

§ 102(e) Date: May 28, 1997

[87] PCT Pub. No.: WO96/16785

PCT Pub. Date: Jun. 6, 1996

[51] Int. Cl.[7] .............................. B29C 45/16; B05D 1/36

[52] U.S. Cl. ................... 264/255; 264/328.7; 264/328.8; 425/130; 427/407.1

[58] Field of Search ................................ 264/255, 328.7, 264/328.8; 425/130; 427/407.1

[56] References Cited

U.S. PATENT DOCUMENTS

| | | | |
|---|---|---|---|
| 3,847,525 | 11/1974 | Biefeldt et al. | 425/245 R |
| 4,081,578 | 3/1978 | Van Essen et al. | 428/63 |
| 4,207,049 | 6/1980 | Malo et al. | 425/129 R |

FOREIGN PATENT DOCUMENTS

| | | |
|---|---|---|
| 3-247423 | 11/1991 | Japan . |
| 05301251A | 11/1993 | Japan . |
| 6-198672 | 7/1994 | Japan . |
| 6-262656 | 9/1994 | Japan . |
| 7-299840 | 11/1995 | Japan . |

*Primary Examiner*—Jan H. Silbaugh
*Assistant Examiner*—Suzanne E Mason
*Attorney, Agent, or Firm*—Sidley & Austin

[57] ABSTRACT

The present invention is an injection compression molding method and apparatus therefor which are capable of using a simple structure for rapidly molding a multilayer molded product with high strength and high accuracy. A molding method for attaining such characteristics includes the steps of extending an injected molten resin (51) by compressing the same in metal molds (31, 32), opening the metal molds during or after the extending operation, injecting a surface layer material (60) into a cap (δ) occurring between the metal molds (31, 32) and the molded resin (51) when the molds are opened, closing the molds during or after the injecting of the surface layer material (60), and cooling the resin (51) and the surface layer material (60) in the closed metal molds (31, 32).

6 Claims, 2 Drawing Sheets

INJECTION COMPRESSION MOLDING METHOD AND APPARATUS

TECHNICAL FIELD

The present invention relates to an injection compression molding method and an apparatus therefor, and particularly to an injection compression molding method and an apparatus therefor which are capable of using a simple structure for rapidly molding a multilayer molded product with high strength and high accuracy.

BACKGROUND ART

Many of the resin molded products are molded by using one kind of material, but some of them are multilayer molded products of the same material or different kinds of materials in order to obtain strength or to add a special function such as, for examples electromagnetic wave shielding. It can be said that applying a surface coating to a molded product provides one type of the above-described multilayer molded products. As for the conventional art for obtaining such multilayer molded products, the following can be cited.

There is an injection molding method in which a number of movable metal molds of different sizes are provided for use with one fixed metal mold. In this method, the combinations of the metal molds are changed by successively chancing a movable metal mold of small size to that of a larger size for use with the one fixed metal mold, and by laying resin of the same material or different materials each time when the combination is changed, a multilayer product is obtained.

However, the entire structure becomes complicated by including a number of movable metal molds. The change of the movable metal molds cannot be carried out until a molded product has been solidified to some extent by cooling the resin; therefore, the total time for molding becomes longer. In addition, synchronous programs for each motion of the movable metal mold and for changing operation of the movable metal molds become complicated.

As for arts for surface coating, these include an art for coloring the surface of a finished molded product by a spray or a brush, an art for using colored resin for the top layer of a multilayer molded product molded based on the above-described conventional injection molding, method, and an insert injection molding art for carrying out injection molding by previously providing a ready-made colored sheet inside the metal molds.

However, surface coating by a spray or the like requires a coating device or manpower, and compatibility (mutually soluble property) cannot be secured on the boundary surface between the coating material and the molded product unless special coating material is used; therefore, the adhering strength of the coating material to the molded product and the bonding strength of the coating material itself become lower. The accuracy in coating, such as coating thickness, coating flatness, or the like, becomes lower. An insert injection molding art has an advantage that various kinds of patterns and designs can adhere to the surface of a molded product; but unless the metal molds are heated, compatibility on the boundary surface between the resin and a colored sheet cannot be expected; therefore, the adhering strength of the colored sheet to the molded product is low.

As for another surface coating art, there is known an injection molding method in which metal molds are slightly opened after a cooling step is completed (specifically, a condition in which a gap occurs inside the metal molds by the shrinkage of the molded product), coating material is injected from a coating nozzle provided in the metal molds, the molds are closed again, and the coating material in the gap is dried (refer to, for example, Japanese Patent Application Laid-open No. 6-198672). This is an improved method of an injection molding method in which the amount of closing is not controlled; while in the injection compression molding method, the amount of closing is freely controlled by a movable metal mold. Specifically, if the molds are closed after injecting the coating material, while the resin is still hot, by an ordinary injection molding method, there is no gap between the metal molds and the molded product, so that the coating material has no place to go. Therefore, the coating material and the resin, which are still in liquid form, leak to the outside of the metal molds, resulting in poor molding. The above-described improved method solves the disadvantage, and enables the surface coating.

However, in the above-described improved injection molding method, the time of the completion of the drying of the coating material is delayed as much as the time required for the resin to be cooled. Since the gap into which the coating material is injected is basically determined not by the amount of closing but by the amount of shrinkage, the leakage from the metal molds to the outside occurs if an excessive amount of the coating material is injected. On the other hand, if the amount of injected coating material is too small, irregular coating will occur. When the thickness of a molded product is uneven, the amount of shrinkage differs at every uneven point, so that the amount of the gap caused by the shrinkage varies; therefore, irregular coating occurs. Further, since coating material is injected after the resin is cooled, compatibility on the boundary surface between the resin and the coating material cannot be expected; therefore, there is a disadvantage of a lower adhering strength of the coating material to the molded product and a lower bonding strength of the coating material itself.

SUMMARY OF THE INVENTION

The present invention is made to eliminate the disadvantages of the above-described conventional art, and its object is to provide an injection compression molding method and apparatus therefor which are capable of using a simple structure for rapidly molding a multilayer molded product with high accuracy and high strength.

Explaining with reference to FIG. 1 , an injection compression molding method relating to the present invention is an injection compression molding method for obtaining a molded product by freely compressing, in metal molds consisting of a movable metal mold and a fixed metal mold, the molten resin which has been injected into the metal molds, characterized by including the steps of:

i) extending the molten resin by compressing the same in the metal molds (Step 101), and opening the metal molds during or after the extending operation (Step 102);

ii) injecting a surface layer material into a gap occurring between the metal molds and the extended resin when the metal molds are opened (Step 103), and closing the metal molds during or after the injecting of the surface layer material (Step 104); and iii) cooling the resin and the surface layer material in the closed metal molds (Step 105).

In the above-described method, a molded product is obtained by injecting the molten resin into a cavity, formed between the movable metal mold and the fixed metal mold; and freely compressing the injected molten resin, in the cavity of the movable metal mold and the fixed metal mold, by moving the movable metal mold. According to the above-described method of the invention, the surface layer material is extended on the resin surface, while the resin in the metal molds is still hot. Accordingly, based on the following operation, a multilayer molded product can be taken out of the metal molds.

(1) Since the surface layer material is extended while the resin is still hot, the boundary surfaces of the resin and the surface layer material are integrally compatibilized, and the entire strength as a molded product is increased. When, for example, the surface layer material is a coating material, the adhering strength of the coating material to the molded product and the bonding strength of the coating material itself are increased. In addition, since the resin is hot, the drying rate of the surface layer material, such as coating material or the like, is increased.

(2) Since the surface layer material is extended on a hot surface of resin, an evenness on the surface layer of the surface layer material can be maintained. Even if an excessive amount of the surface layer material is injected, poor molding, such as the leakage of the surface layer material and the molten resin to the outside or the like, can be prevented from occurring, by adjusting the amount of the movement of the movable metal mold (incidentally, in an injection molding method, a movable metal mold cannot be freely controlled like the above). For example, when the surface layer material is a coating material, coating irregularity does not occur and an excellent appearance can be obtained.

An injection compression molding apparatus relating to the present invention is an injection compression molding apparatus equipped with metal molds, consisting of a movable metal mold and a fixed metal mold, for obtaining a molded product by freely compressing, in the metal molds, the molten resin which has been injected into the metal molds, characterized by including:

a surface layer material injecting means for injecting a surface layer material into a gap between the metal molds and the resin which has been injected into the metal molds; and a control means for extending the resin by compressing the same in the metal molds, opening the metal molds during or after the extending operation, injecting the surface layer material from the surface layer material injecting means into the gap occurring between the metal molds and the resin when the metal molds are opened, closing the metal molds during or after the injecting of the surface layer material, and cooling the resin and the surface layer material in the closed metal molds.

In the above structure, the above-described method of the invention is memorized as an operation program; and besides the control means for controlling the operation, the surface layer material injecting means is included. By using the apparatus of the present invention, for example, when the surface layer material and the resin are of different materials, a multilayer (for example, two-layer) molded product can be obtained. The operation of the apparatus of the present invention conforms to the explanation of the above-described method of the invention.

BRIEF DESCRIPTION OF THE DRAWINGS

FIG. 3A is an explanatory diagram of a condition in which the movable metal mold is separated from the fixed metal mold;

FIG. 3B is an explanatory diagram of a condition in which the movable metal mold is moved to the fixed metal mold;

FIG. 3C is an explanatory diagram of the injection of the molten resin into the mold cavity;

FIG. 3D is an explanatory diagram of the extension of the molten resin;

FIG. 3E is an explanatory diagram of a condition in which the movable metal mold is separated from the fixed metal mold as far as a gap δ;

FIG. 3F is an explanatory diagram of the injection of coating material into the gap δ;

FIG. 3G is an explanatory diagram of a condition in which the metal molds are stopped with the resin and the coating material being compressed and molded; and FIG. 3H is an explanatory diagram of a condition in which the metal molds are opened to take out a molded product.

BEST MODE FOR CARRYING OUT THE INVENTION

A preferred embodiment of an injection compression molding method and apparatus relating to the present invention will be particularly described below with reference to the attached drawings.

Figure 1:
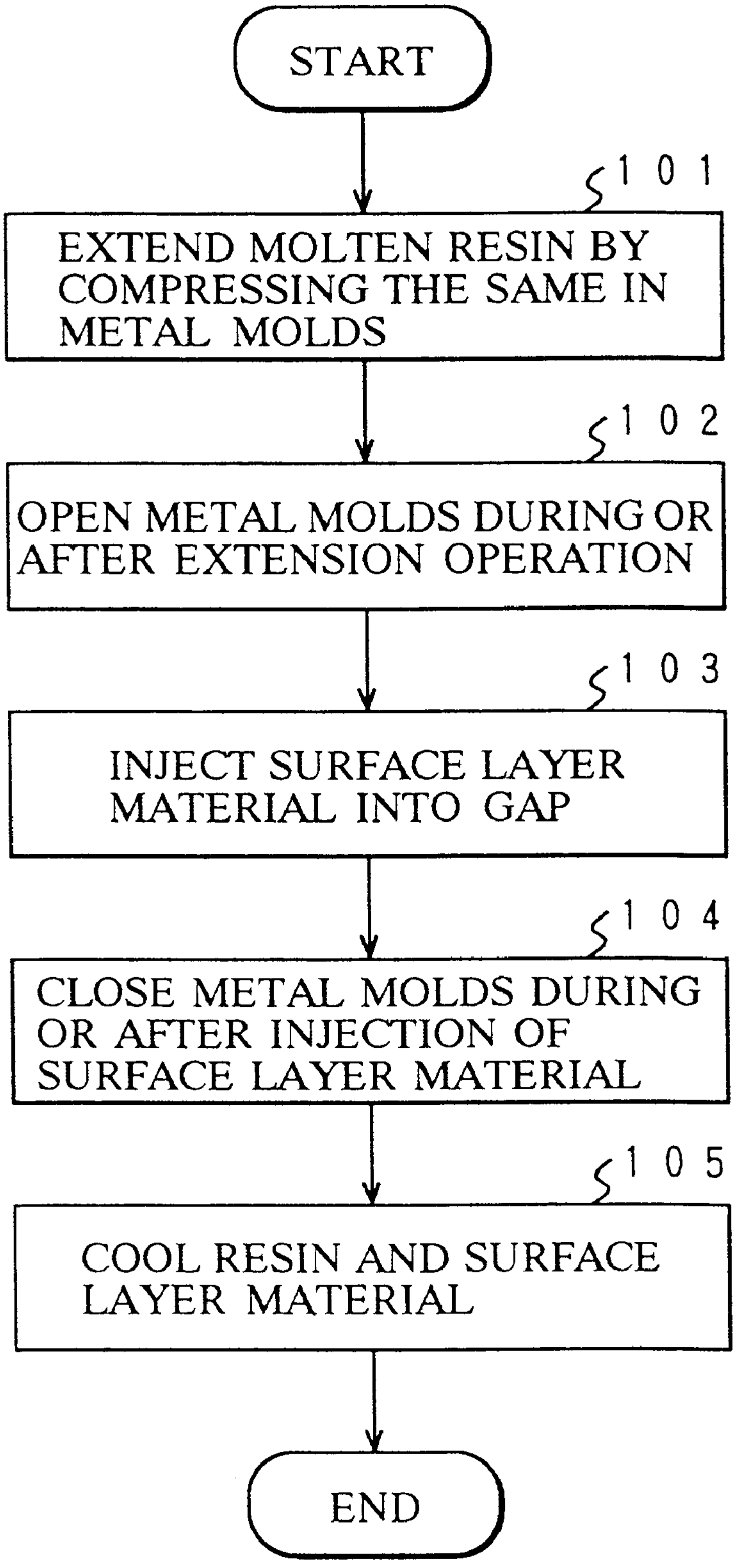
FIG. 1 is a flow chart of an injection compression molding method relating to the present invention.
Figure 2:
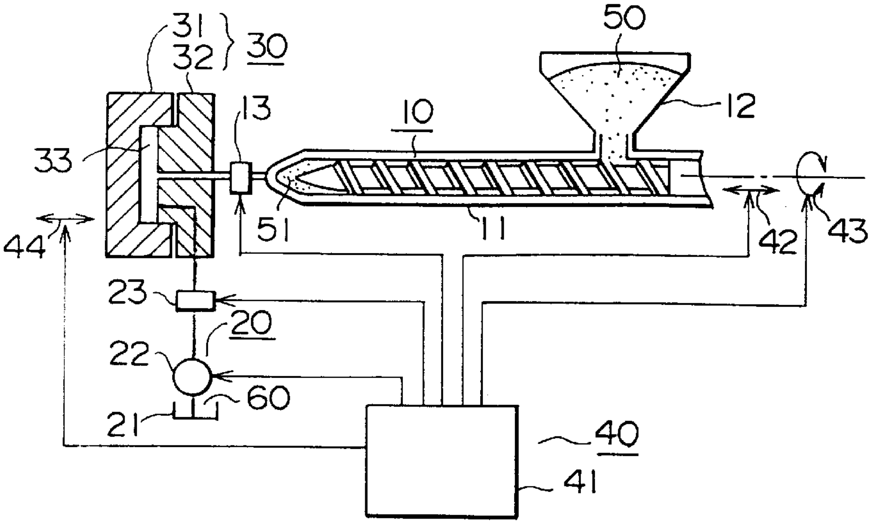
FIG. 2 is a schematic block diagram of an injection compression molding apparatus relating to a first embodiment of the present invention.

FIG. 2 is an example of an apparatus for coating a surface layer material (hereinafter referred to as a coating material 60), including filler metal for electromagnetic shielding, on the surface of a molded product; and the apparatus is equipped with a resin injecting section 10, a coating material injecting means 20 forming a surface layer material injecting means, a resin compressing section 30, and a control means 40.

The resin injecting section 10 includes a screw cylinder 11, a hopper 12, and an on-off valve 13. The screw cylinder 11 is freely and directly moved by a direct acting actuator 42 and is freely rotated by a rotary actuator 43, and by synchronously operating these actuators 42 and 43, pellet-formed resin 50 supplied from the hopper 12 is mixed and melted. This molten resin 51 is injected from the on-off valve 13 into a cavity 33, inside the metal molds 31 and 32, via the injection passage provided in the fixed metal mold 32.

The coating material injecting means 20 is defined by a tank 21, an injecting pump 22, and an on-off valve 23. The coating material 60, from the tank 21, is injected into the cavity 33 inside the metal molds 31 and 32 via the injecting pump 22, the on-off valve 23, and the injecting passage which is provided inside the fixed metal mold 32.

The resin compressing section 30 is defined by the movable metal mold 31 and the fixed metal mold 32. The movable metal mold 31 is freely and directly moved toward the fixed metal mold 32 by a direct acting actuator 44, and freely compresses and molds the molten resin 51, or the molded resin 51 and the coating material 60 in the cavity 33 inside the metal molds 31 and 32.

The control means 40 is defined by a controller 41, which comprises a micro computer, etc.; the actuators 42 to 44; the on-off valve 13; the injecting pump 22; and the on-off valve 23. Incidentally, the injection compression molding apparatus of the conventional art is also equipped with a controller for synchronously controlling the actuators 42 to 44 and the on-off valve 13, but the control means 40 of the invention is additionally equipped with the synchronous control of the injecting pump 22 and the on-off valve 23 as compared to the conventional controller. The synchronous control of each of the actuators 42 to 44, the on-off valves 13 and 23, and the injecting pump 22 will be explained below with reference to FIGS. 3A to 3H.

Figure 3A:
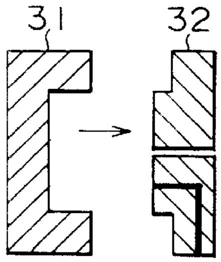
FIGS. 3A to 3H are schematic explanatory diagrams of a resin compressing section (metal molds) in a series of controlling steps relating to the first embodiment.

As FIG. 3A illustrates, in a condition in which the movable metal mold 31 is separated from (is away from) the fixed metal mold 32, the controller 41 sends a command to the direct acting actuator 44.

Figure 3B:
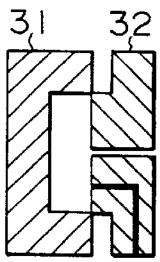
Figure 3C:
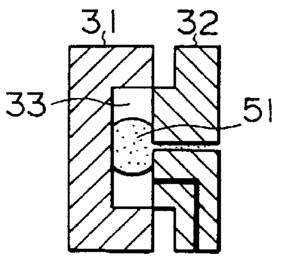
Figure 3D:
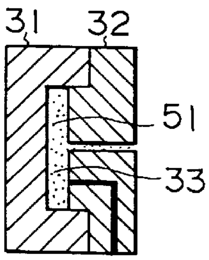
Figure 3E:
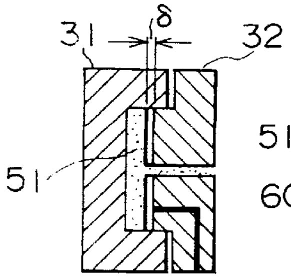

By this command, as FIG. 3B illustrates, the movable metal mold 31 is moved to the position where the molten resin 51 can be injected from the resin injecting section 10 through the fixed metal mold 32. After the completion of this movement, the controller 41 sends a command to the direct acting actuator 42, the rotary actuator 43, and the on-off valve 13. By this command, as FIG. 3C illustrates, a specified amount of molten resin 51 is injected from the injecting section 10 into the cavity 33 inside of the metal molds 31 and 32. During the injection, or after the completion of the injection of the molten resin 51, the controller 41 sends a command to the direct acting actuator 44, and as FIG. 3D illustrates, the molten resin 51 is extended in the cavity 33 by moving the movable metal mold 31 further toward the fixed metal mold 32.

During the above-described extending operation or after the completion of the extending operation, it is preferable that the controller 41 finds the timing when a skin layer (surface hardening layer) is formed on a molded resin surface of the molten resin 51 and sends a mold opening command to the direct acting actuator 44 to separate the movable metal mold 31 from the fixed metal mold 32 as far as a gap δ. In such a way, the molded resin 51, with a skin layer being formed on the surface, is prevented from losing shape by the skin layer, though the molded resin 51 is still hot, and is separated from the fixed metal mold 32, adhering to the movable metal mold 31. By this separation, the gap δ is secured between the surface of the molded resin 51 and the fixed metal mold 32. Specifically, the gap δ is the total of a gap δ1 between the surface of the molded resin 51 and the fixed metal mold 32 and a gap δ2 between the back surface of the molded resin 51 and the movable metal mold 31 (δ=δ1+δ2).

Incidentally, the timing of the above-described mold opening command can be a time controlled by a timer from the time when the movable metal mold 31 is at a specified position (for example, the position where the extending operation is started). This mold opening command can be sent at a time when the movable metal mold 31 reaches a specified position (for example, the position previously determined by experiment, etc., where a skin layer of a specified thickness is formed) based on the extending speed.

Figure 3F:
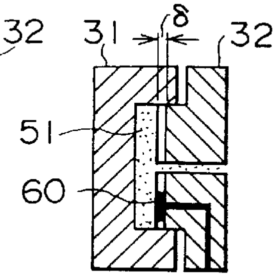
Figure 3G:
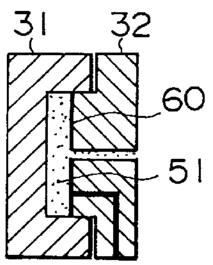

During the above-described separation or after the completion of the separation, the controller 41 sends a command to the injecting pump 22 and the on-off valve 23, and as FIG. 3F illustrates, the coating material 60 is injected into the gap δ from the coating material injecting means 20 (the injecting position corresponds to the above-described gap δ1). During or after the injecting of the coating material 60, the controller 41 sends a command to the direct acting actuator 44, and, as FIG. 3G illustrates, moves the movable metal mold 31 toward the fixed metal mold 32 again, then stops the movable metal mold 32, compressing and molding the molded resin 51 and the coating material 60. At this time, the coating material 60 is extended to every corner of the inside of the gap δ1. Incidentally, it is preferable that the injecting pressure of the coating material 60 is a small pressure which does not break the skin layer.

Figure 3H:
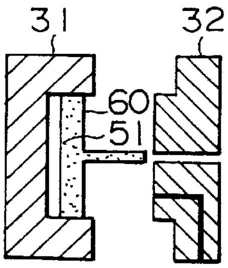

The controller 41 finds the timing when the molten resin 51 and the surface layer material (coating material) 60 are cooled and solidified, or the timing when a problem does not occur to the molded product or on the surface thereof even if the molded product is taken out, and sends a command to the direct acting actuator 44. By this command, as FIG. 3H illustrates, the movable metal mold 31 is separated from the fixed metal mold 32, then the metal molds 31 and 32 are opened, and the coated molded product can be taken out.

The effect of the above-described first embodiment is as follows.

(1) The rate of the drying of the coating material 60 is large since the coating material 60 is extended on the surface of the molded resin 51 while the molded resin 51 inside the metal molds 31 and 32 is still hot. In addition, since the coating material 60 is extended while the resin 51 is still hot, the molded resin 51 and the coating material 60 are integrally compatibilized on the boundary surface, and the adhering strength of the coating material 60 to the molded resin 51 is increased with the bonding strength of the coating material 60 itself being increased.

(2) Even if an excessive amount of the coating material 60 is injected, the amount of extension of the coating material 60 can be made uniform by adjusting the amount of movement of the movable metal mold 31; therefore, there is no irregularity produced on the coating and an excellent appearance is maintained. If the coating material 60, including the above-described filler metal, is used as a coating material in, for example, the above-described Japanese Patent Application Laid-open No. 6-198672, the filler metal prevents the flow; therefore, the coating material 60 is difficult to be extended unless the amount of the opening of the metal molds is increased. However, when the amount of the opening of the metal molds is increased, as pointed out in the disadvantages of the above-described Japanese Patent Application Laid-open No.6-198672, an excessive amount of coating material 60 is injected, so that the leakage from the metal molds to the outside occurs, or irregularities are caused on the coating. On the other hand, according to the present embodiment, there is no irregularity on the coating and an excellent appearance is obtained.

Now, the other embodiments will be explained.

In the first embodiment, the injection passage of the coating material 60 is only provided in the fixed metal mold 32, but the second embodiment is an example in which an injection passage branching from the on-off valve 23 is further provided in the movable metal mold 31. The control of the second embodiment is basically the same as that of the first embodiment, but differs in a point that the coating material 60 is injected into the gaps δ1 and δ2.

The third embodiment is an example in which a plurality of surface layer material injecting means 20 is provided. For example, in the case that two of the surface layer material injecting means 20 are provided, one is a means for injecting liquefied resin including a large amount of an electromagnetic wave shielding filler metal, and the other is a means for injecting only coating material. In this case, when explaining with reference to FIG. 2, the control is carried out as the following steps I) to v).

i) The molten resin 51 is extended by, compressing the same in the metal molds 31 and 32, and the metal molds are opened during or after the extending operation, ii) the above-described liquefied resin is injected into the gap δ occurring between the metal molds 31 and 32 and the resin 51 when the molds are opened, and during or after the injecting of the resin, the metal molds are closed, iii) the resin 51 and the liquefied resin are slightly cooled in the metal molds 31 and 32 as they are, and the metal molds are opened again, iv) a simple coating material is injected into the gap δ occurring between the metal molds 31 and 32 when the molds are opened, and during or after the injecting of the simple coating material, the molds are closed, and v) the resin 51, the liquefied resin, and the simple coating material are cooled in the metal molds 31 and 32 as they are.

Specifically, the control is conducted in such a way as the steps iv) and v) are almost a repetition of the steps ii) and iii).

The fourth embodiment is a modified example of the steps of the third embodiment. The above-described embodiment is the case of the surface layer being a thin layer, but a molded product sandwiching the resin including electromagnetic wave shielding filler metal between layers of the resin 51 can be made. In this case, the control is carried out as follows.

i) The molten resin 51 is extended by compressing the same in the metal molds 31 and 32, and during or after the extending operation, the metal molds are opened, ii) the liquefied resin, including the above-described filler metal, is injected into the gap δ occurring between the fixed metal mold 32 and the resin 51 when the molds are opened, and during or after the injecting of the liquefied resin, the metal molds are closed, iii) the resin 51 and the liquefied resin are slightly cooled in the metal molds 31 and 32 as they are, and the metal molds are then opened again, iv) additional molten resin 51 is injected into the gap δ occurring between the fixed metal mold 32 and the liquefied resin when the metal molds are opened, and during or after the injecting of the resin 51, the metal molds are closed, and v) the resin 51 and the liquefied resin are cooled in the metal molds 31 and 32 as they are.

Specifically, even when a plurality of resin injecting sections 10 for different materials is provided, a molded product with excellent compatibility, which requires shorter producing time, can be obtained as in the first embodiment by carrying out the control of repeating the steps ii) and iii) as in the above.

INDUSTRIAL AVAILABILITY

The present invention is useful as an injection compression molding method and an apparatus therefor, capable of rapidly obtaining a multilayer molded product of a high strength and high accuracy by using a simple structure in which a surface layer material is extended on the surface of hot resin inside the metal molds.

What is claimed is:

1. An injection compression molding method for obtaining a molded product by freely compressing, in a cavity formed by metal molds comprising a movable mold and a fixed mold, molten resin which has been injected into said cavity, said method comprising the steps of:

extending the thus injected molten resin by compressing the same in said cavity;

during or after the extending, forming a skin layer on a surface of the molten resin in said cavity;

then moving the movable mold slightly away from the fixed mold, thereby forming at least one gap between (a) said molds and (b) the skin layer;

injecting a surface layer material into at least one of said gaps, while the resin in said cavity is still hot such that the skin layer and the surface layer material are compatibilized by mutual solubility at a boundary therebetween;

during or after the injecting of the surface layer material, moving the movable mold toward the fixed mold; and then cooling said resin and said surface layer material in the cavity of the metal molds.

2. A method in accordance with claim 1, wherein said molds consist of said movable mold and said fixed mold.

3. A method in accordance with claim 1, wherein, during the moving of the movable mold toward the fixed mold, the thus injected surface layer material is extended to every corner of said at least one gap.

4. A method in accordance with claim 1, further comprising opening the metal molds and removing from the opened molds a molded product comprising said resin and said surface layer material.

5. A method in accordance with claim 1, wherein said surface layer material includes filler metal.

6. A method in accordance with claim 1, wherein the steps of injecting a surface layer material into at least one of said gaps comprises injecting an excess amount of the surface layer material into at least one of said gaps, and adjusting the moving of the movable mold toward the fixed mold in order to provide an excellent appearance of the resulting molded product.

* * * * *

UNITED STATES PATENT AND TRADEMARK OFFICE

CERTIFICATE OF CORRECTION

PATENT NO. : 6,143,226
DATED : November 7, 2000
INVENTOR(S) : Satoshi Fujimoto and Makoto Nogawa It is certified that error appears in the above-identified patent and that said Letters Patent is hereby corrected as shown below:

Title page,
Insert -- [30] Foreign Application Priority Data, Nov. 28, 1994 [JP] Japan 6/316048 --.

Signed and Sealed this

Twenty-third Day of October, 2001

*Attest:*

*Nicholas P. Godici*

NICHOLAS P. GODICI

*Attesting Officer* *Acting Director of the United States Patent and Trademark Office*